(12) United States Patent
Andrade

(10) Patent No.: US 9,100,722 B2
(45) Date of Patent: *Aug. 4, 2015

(54) FILTERING AND TAILORING MULTIMEDIA CONTENT BASED ON OBSERVED USER BEHAVIOR

(71) Applicant: Apple Inc., Cupertino, CA (US)

(72) Inventor: Jose Olav Andrade, Aptos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,280

(22) Filed: Aug. 11, 2014

(65) Prior Publication Data

US 2014/0351840 A1 Nov. 27, 2014

Related U.S. Application Data

(63) Continuation of application No. 12/015,457, filed on Jan. 16, 2008, now Pat. No. 8,832,753.

(51) Int. Cl.
| | |
|---|---|
| *H04N 7/173* | (2011.01) |
| *H04N 7/16* | (2011.01) |
| *H04N 5/91* | (2006.01) |
| *H04N 21/81* | (2011.01) |
| *G06F 17/30* | (2006.01) |
| *H04N 21/235* | (2011.01) |
| *H04N 21/422* | (2011.01) |
| *H04N 21/4223* | (2011.01) |
| *H04N 21/435* | (2011.01) |
| *H04N 21/44* | (2011.01) |
| *H04N 21/442* | (2011.01) |
| *H04N 21/45* | (2011.01) |
| *H04N 21/84* | (2011.01) |
| *G06Q 30/02* | (2012.01) |

(52) U.S. Cl.
CPC ........ *H04N 21/812* (2013.01); *G06F 17/30817* (2013.01); *G06F 17/30828* (2013.01); *G06Q 30/0269* (2013.01); *H04N 7/163* (2013.01); *H04N 21/235* (2013.01); *H04N 21/4223* (2013.01); *H04N 21/42201* (2013.01); *H04N 21/435* (2013.01); *H04N 21/44008* (2013.01); *H04N 21/44204* (2013.01); *H04N 21/44213* (2013.01); *H04N 21/4532* (2013.01); *H04N 21/84* (2013.01)

(58) Field of Classification Search
CPC ... H04N 21/812; H04N 7/163; H04N 21/235; H04N 21/42201; H04N 21/4223
See application file for complete search history.

(56) References Cited

U.S. PATENT DOCUMENTS

| | | | |
|---|---|---|---|
| 5,867,226 | A | 2/1999 | Wehmeyer et al. |
| 7,051,352 | B1 | 5/2006 | Schaffer |

(Continued)

*Primary Examiner* — Pankaj Kumar
*Assistant Examiner* — Alazar Tilahun
(74) *Attorney, Agent, or Firm* — Blakely, Sokoloff, Taylor & Zafman LLP

(57) ABSTRACT

A user is given the ability to control the display of content items such as advertisements, by for example skipping over content items that are not of interest. Metadata tags associated with non-skipped viewings of content are stored and tracked. Subsequently, candidate content items are scored according to their metadata tags, giving higher scores to candidate content items associated with higher occurrences of non-skipped viewings. The higher-scoring candidate content items can then be favored over other candidate content items. Thus, based on the choices the user makes with respect to skipping or not skipping particular content items, inferences are made as to the user's level of interest in various subjects, and subsequent content items are delivered in a personalized manner to the user.

20 Claims, 8 Drawing Sheets

(56) References Cited

U.S. PATENT DOCUMENTS

| | | |
|---|---|---|
| 7,590,993 B1 | 9/2009 | Hendricks et al. |
| 2002/0023167 A1 | 2/2002 | Kurihara et al. |
| 2002/0065678 A1 | 5/2002 | Peliotis et al. |
| 2002/0152474 A1 | 10/2002 | Dudkiewicz |
| 2003/0122966 A1 | 7/2003 | Markman et al. |
| 2005/0149964 A1 | 7/2005 | Thomas et al. |
| 2007/0143260 A1 | 6/2007 | Markov et al. |
| 2008/0066107 A1 | 3/2008 | Moonka et al. |

FILTERING AND TAILORING MULTIMEDIA CONTENT BASED ON OBSERVED USER BEHAVIOR

This application is a continuation of co-pending U.S. application Ser. No. 12/015,457 filed on Jan. 16, 2008.

FIELD OF THE INVENTION

The present invention relates to presentation of personalized content to users, and more particularly to methods and systems for filtering multimedia content based on observed behavior of users.

DESCRIPTION OF THE RELATED ART

Advertising is most effective when it is tailored to individuals. Users are more likely to respond to advertisements when they describe products or services that are of particular interest. Since areas of interest vary from user to user, response rates can be improved by presenting different advertisements to those different users.

Conventionally, tailoring of advertisements is done at a relatively coarse level. For example, in the context of television commercials, different types of advertisements are presented at different times. The television audience varies in size and composition, depending on the time of day, the program being shown, and other factors; this information is used by television broadcasters to show advertisements that are likely to be of interest to the viewing audience of a particular show at a particular time of day.

However, such coarse tailoring is only partially effective. In general, for a broadcast or cable television program, the same commercial is being shown to all users (viewers) at a given time. Some geographic tailoring may be performed, but only at a regional level, so that users in one metropolitan area might see one set of commercials and users in another metropolitan area might see a different set of commercials. Furthermore, television advertisements do not take into account any specific preferences or observed behavior of individual users so as to further maximize the likelihood that a particular advertisement will be of interest to a particular user.

What is needed is a technique for tailoring television advertisements (or other multimedia content) at a more specific level, such as at the level of the household or individual user. What is further needed is a technique for observing user behavior, particularly with respect to advertisements, and to use such observed behavior in further tailoring presentation of ads.

SUMMARY OF THE INVENTION

According to the present invention, a user is given the ability to control the display of content items such as advertisements, by for example skipping over content items that are not of interest. Metadata tags associated with non-skipped viewings of content are stored and tracked. In this manner, the user's behavior with respect to content associated with the various metadata tags is stored. Subsequently, candidate content items are scored according to their metadata tags, giving higher scores to candidate content items associated with higher occurrences of non-skipped viewings. The higher-scoring candidate content items are then favored over other candidate content items. Thus, based on the choices the user makes with respect to skipping or not skipping particular content items, inferences are made as to the user's level of interest in various subjects, and subsequent content items are delivered in a personalized manner to the user.

For example, the system of the present invention can operate in the context of television programming that is being watched, for example, on a digital video recorder (DVR) that allows users to skip content (such as commercials).

Other behavior can also be observed and associated with metadata tags. For example, if a user watches a content item repeatedly, an inference can be made that he or she is particularly interested in the content item. Similarly, inferences can be made based on the user turning up or down the volume during a content item, changing channels during a content item, or even turning off the television or other device when a content item appears.

In one aspect, the present invention uses a Bayesian filter analysis to make determinations as to the likelihood that a particular content item will be of interest to a particular user, given the user's past behavior with respect to content items. The results of the Bayesian analysis are a set of probabilities that can be ranked so that appropriate content items can be selected for display to the user.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

For purposes of the following description, the term "user" is used to refer to individuals or groups that are potential consumers of content such as advertisements. The term "user" can thus refer to a viewer, listener, player (of a video game, for example), or the like. The use of the term "user" is not intended to be limiting in any way.

The present invention is described in the context of television commercials. However, one skilled in the art will recognize that the invention can be implemented in other ways, including for example the presentation of other types of advertisements, or even non-advertisement content. Any mode of presentation can be used, including for example television, radio, Internet, and the like. The particular implementations described herein are intended to be illustrative of the claimed invention, and not limiting.

Figure 3:
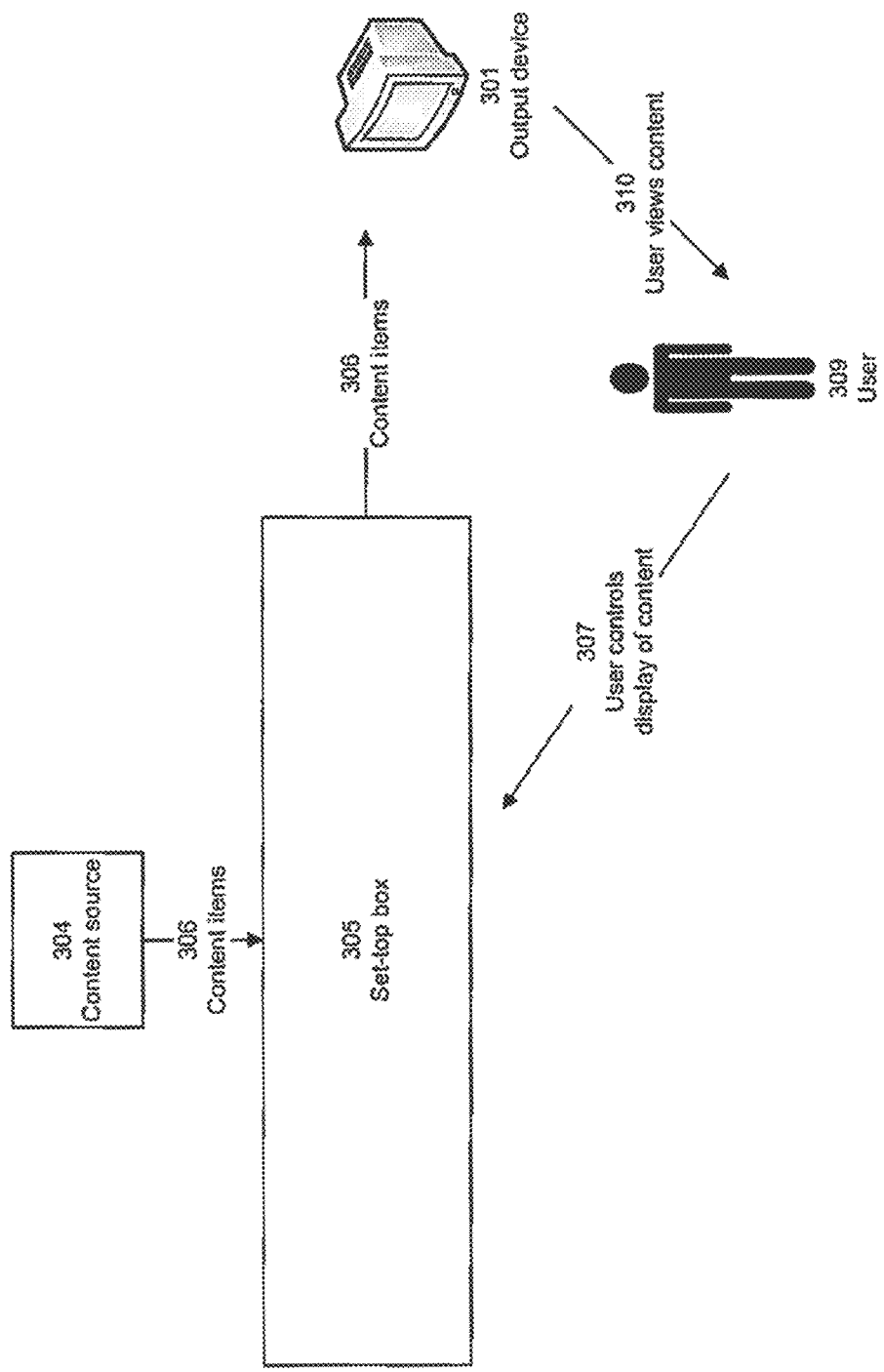
FIG. 3 is a block diagram depicting an architecture for providing content to a user, according to the prior art.

Referring now to FIG. 3, there is shown a block diagram depicting an architecture for providing content to a user, according to the prior art. Content items 306 are transmitted from a content source 304 to a set-top box 305 and displayed to a user 309 via an output device 301 such as a television. The user 309 may view 310 content items 306 in "real-time", i.e., as they are being transmitted to the set-top box 305. Alternatively, the set-top box 305 may include a digital video recorder (DVR) or other recording device, so that the content items 306 are stored on the set-top box 305 and viewed later by the user 309. The user is able to control 307 the display of content 306, for example by changing channels, pausing, rewinding, fast-forwarding, and the like.

Figure 1:
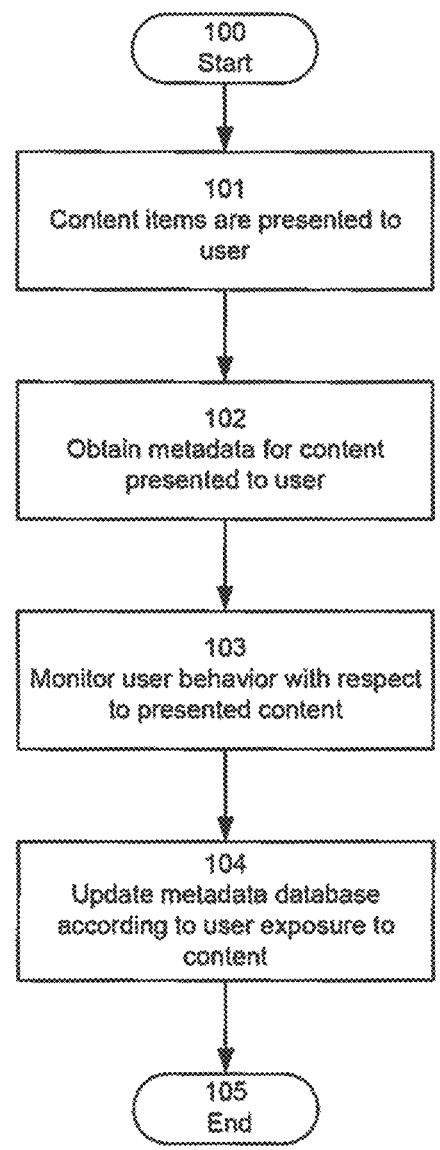
FIG. 1 is a flowchart depicting a method for collecting and storing metadata and user behavior with respect to content presented to a user, according to one embodiment.
Figure 4A:
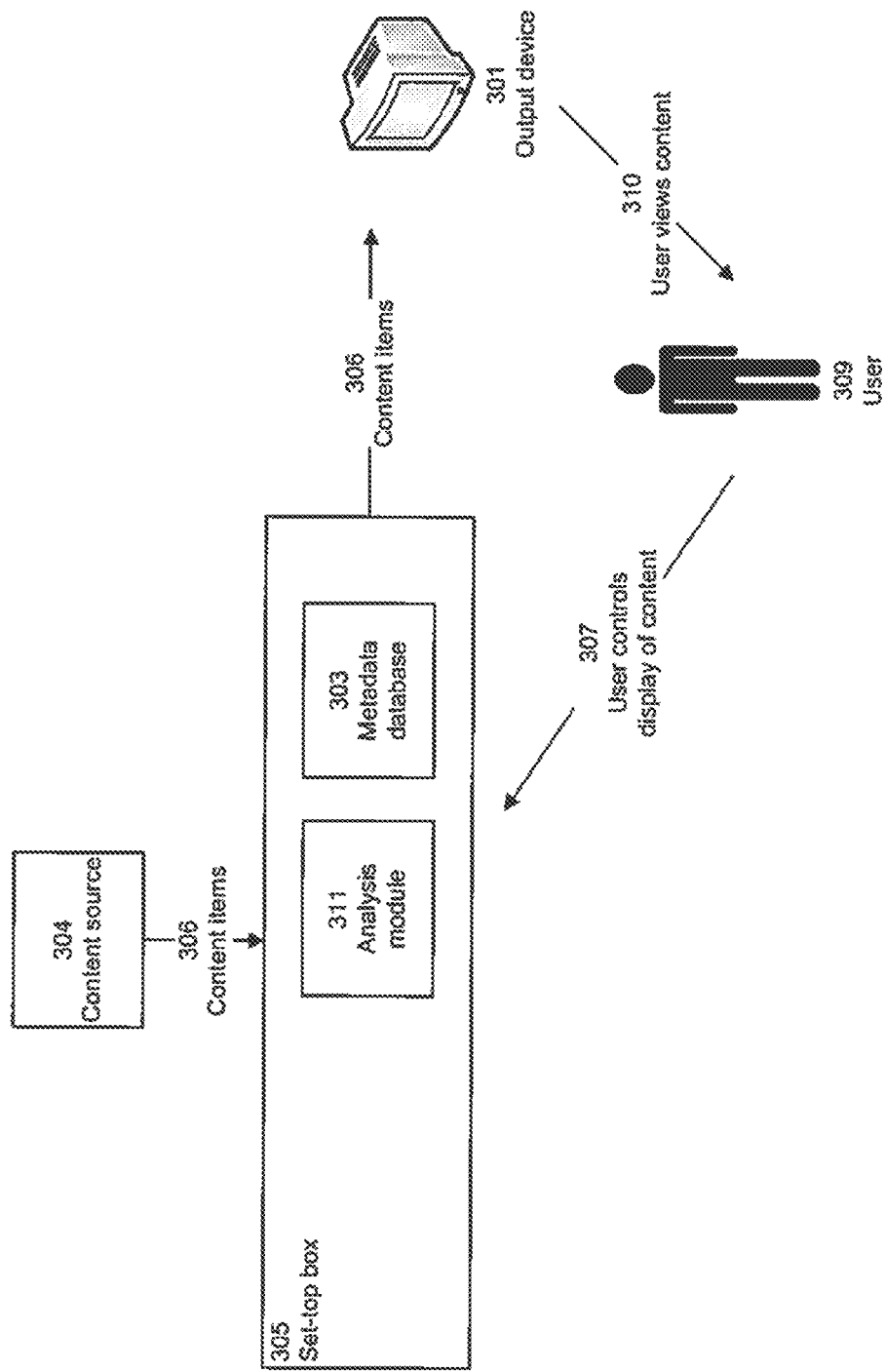
FIG. 4A is a block diagram depicting an architecture for implementing the present invention according to one embodiment, where user behavior data and content metadata are stored locally with respect to the user.

In one embodiment, the present invention is a system for targeting particular content items (such as advertisements) to particular users. Referring now to FIG. 1, there is shown a flowchart depicting a method for collecting and storing metadata and user behavior with respect to content presented to a user, according to one embodiment. Referring also to FIG. 4A, there is shown a block diagram depicting an architecture for implementing the present invention according to one embodiment.

As described above, content items 306 are transmitted from a content source 304 to a set-top box 305 and presented 101 to a user 309 via an output device 301 such as a television. In one embodiment, content items 306 are audiovisual programs such as television commercials; however one skilled in the art will recognize that the present invention can operate with any type of content item 306. In one embodiment, the content source 304 is a broadcast source such as a television station.

Again, the user 309 may view 310 content items 306 in "real-time", i.e., as they are being transmitted to the set-top box 305. Alternatively, the set-top box 305 may include a digital video recorder (DVR) or other recording device, so that the content items 306 are stored on the set-top box 305 and viewed later by the user 309.

Metadata tags are obtained 102 for the presented content items 306, and tracked in metadata database 303. These metadata tags can include, for example, text-based tags such as keywords that describe the content items 306. The tags can be obtained from any source; for example, the metadata tags can be transmitted from the content source 304 to the set-top box 305 in conjunction with transmission of the content 306 itself. Alternatively, the set-top box 305 can obtain the metadata tags by requesting the met data from a server over the Internet. Alternatively, the set-top box 305 can derive the metadata tags from the content source 304 itself, for example by extracting keywords from closed captioning content that accompanies the main content, or by performing speech-to-text analysis on the content, or by some other means. In another embodiment, the user 309 or some other entity can be queried for metadata tags. In yet another embodiment, metadata tags can be provided by the content provider, for example to identify particular commercials as being related to particular products. In yet another embodiment, metadata tags can be obtained based on data from social networking sites, comments of other users, reviews, and the like. For example, if content is posted on a website such as a video sharing site or a social networking site, the comments of other users who have viewed the content can be taken into account in determining what metadata tags apply to the content item.

The user 309 is able to control 307 the display of content items 306 on output device 301, for example by activating controls on the set-top box 305 or on a remote control device. As is well known in the art, the user 309 can cause the set-top box 305 to fast-forward, rewind, pause, and/or skip forwards or backwards, thus providing a mechanism by which the user can control the viewing of content. According to the present invention, such actions by the user are monitored 103; these actions are collectively referred to herein as "user behavior". As the user views and/or skips certain content, the metadata database 303 is updated 104 to include a user exposure score indicating how many times the user was exposed to, and did not skip, the content. In one embodiment, additional details regarding the user's behavior with respect to the content are stored, as described in more detail below.

For example, the specific point in a content item where a user initiated a skip operation is noted, as well as the specific point where the user resumed watching the content. Data records for metadata tags for the content item(s) that were viewed and not skipped are stored 104, for example at database 303 (or, if a record already exists for a metadata tag, the record is updated with new information). If the user skipped some portion of a content item, for example moving on to the next content item or to a later portion of the same content item, the metadata tags for the skipped portion can be ignored, since the user did not actually see the skipped portion.

Thus, in one embodiment, the time at which the user commences skipping is used as a demarcation point between content that was viewed and content that was skipped. Metadata tags for the content that was skipped are ignored. Metadata tags for the content that was viewed are flagged as having been viewed. In addition, in one embodiment, metadata tags at the point where the skip operation was initiated are flagged as having prompted the skip operation.

Metadata database 303 includes records representing metadata tags associated with viewed content. Each record includes certain statistics and/or values concerning the number of times the metadata tag has appeared in content that was viewed and not skipped. In one embodiment, each record indicates how many times the user watched and did not skip content items associated with a particular metadata tag. For example, the database may indicate that content having a metadata tag of "cell phones" was watched 35 times, while content having a metadata tag of "hockey" was watched 72 times. Each metadata tag can be considered to apply to an entire content item, or to just a portion of a content item. If a metadata tag applies to the entire content item (such as a metadata tag that indicates the overall subject of the content item), then the metadata tag is flagged as having been watched if any part of the content item was watched. If a metadata tag applies to a portion of the content item, then the metadata tag is flagged as having been watched only if the corresponding part of the content item was watched and not skipped; if the user skipped over the part of the content item corresponding to the metadata tag, the metadata tag is not flagged as having been watched.

In one embodiment, the metadata database 303 also includes overall statistics describing how often each metadata tag appears in the entire corpus of content. Such information is useful in performing the Bayesian analysis described below. In another embodiment, the Bayesian probability score itself is stored in the metadata database 303.

Figure 4B:
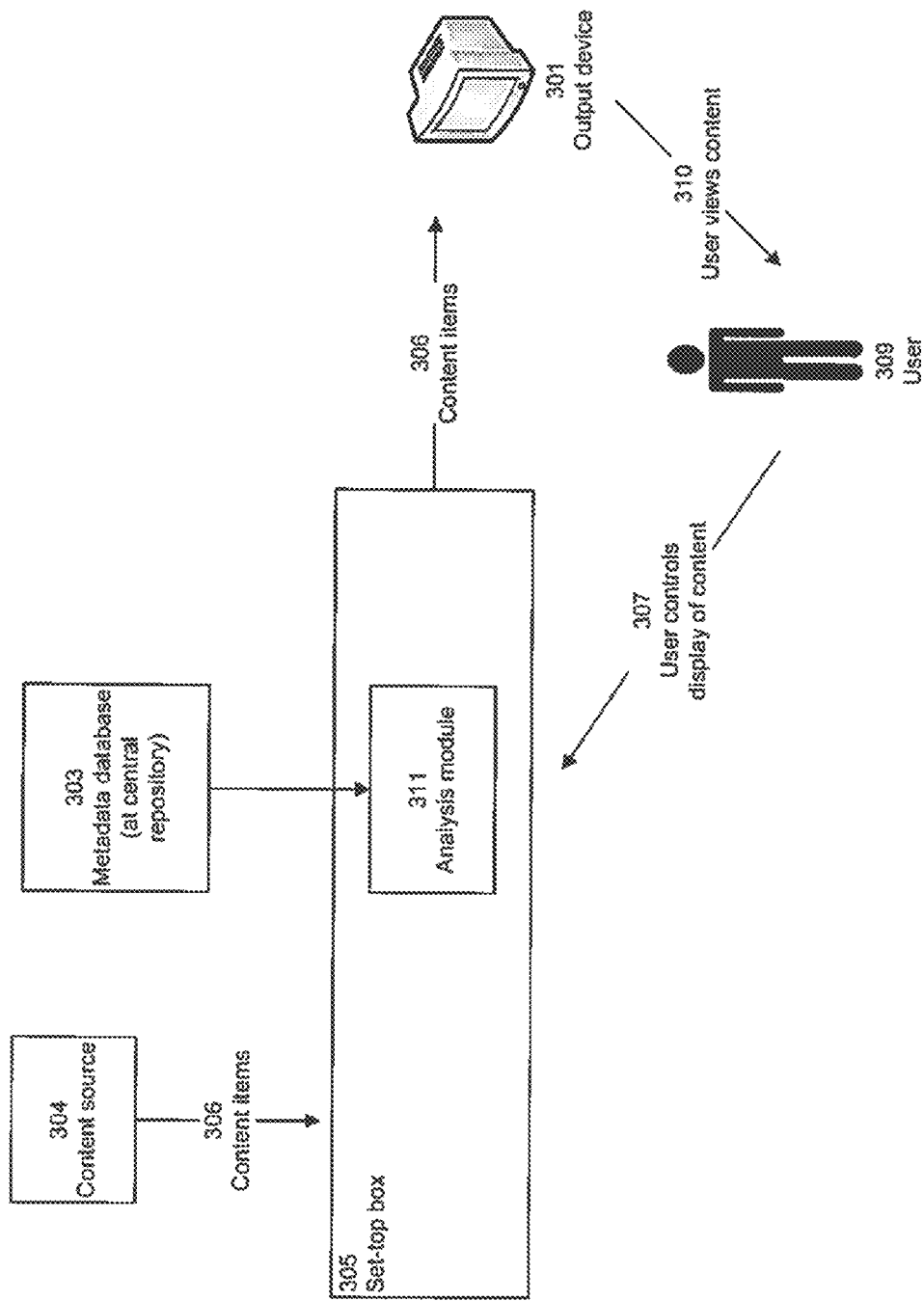
FIG. 4B is a block diagram depicting an architecture for implementing the present invention according to one embodiment, where content metadata is stored at a central location.

In one embodiment, the metadata database 303 is stored at the set-top box 305, although it will be apparent to one skilled in the art that this information can be stored in any desired location. For example, FIG. 4B shows an alternative embodiment where the metadata database 303 is stored at a central location such as a web server that communicates with the set-top box 305 over the Internet. Thus, for example, metadata tags for candidate content items can be obtained at the broadcast head-end and stored in a central database. The metadata can be collected and transmitted to the central location as it becomes available, or it can be transmitted in a batched methodology. The set-top box 305 can retrieve such metadata when it is determining which content items to display to the user 309, as described in more detail below.

Figure 2:
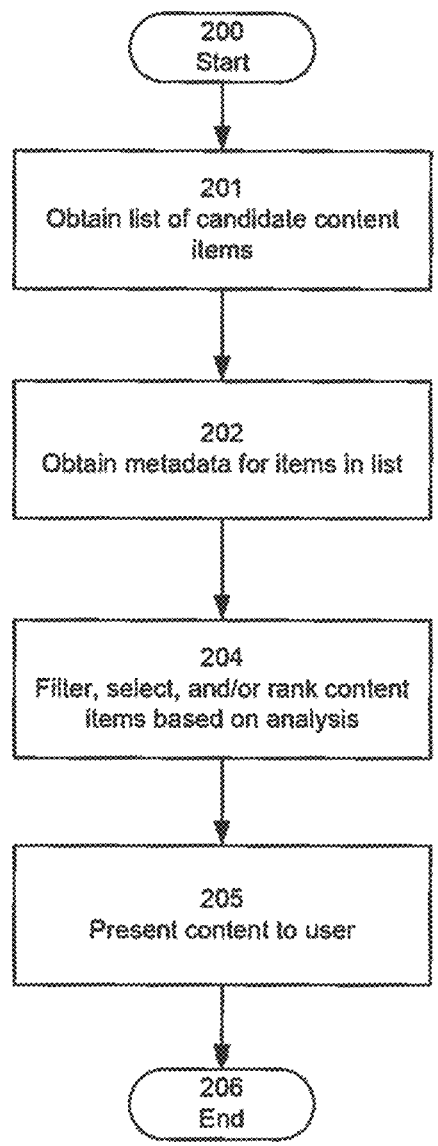
FIG. 2 is a flowchart depicting a method for filtering and tailoring content for presentation to a user, according to one embodiment.

Once some metadata tags (including indications as to how many times the user watched content associated with the metadata tags) have been stored, new content items can be filtered, selected, and ranked. Referring now to FIG. 2, there is shown a method of performing such steps according to one embodiment.

A list of candidate content items is obtained 201. In one embodiment, this includes the content items 306 themselves; for example, the set-top box 305 can receive all the candidate content items 306 from content source 304. Alternatively, the set-top box 305 can initially obtain a list of candidate content items without actually obtaining the content items 306 themselves. This can save bandwidth, as only those content items 306 that are selected for presentation to user 309 need be obtained, as described below in connection with FIG. 6. In another embodiment, content items 306 can be pre-loaded or otherwise obtained at convenient times when traffic load is low, and such content items 306 can be stored at the set-top box 305, so that they are available at the set-top box 305 when needed, as described below in connection with FIG. 5.

Next, metadata tags for the candidate content items 306 are obtained 202. The metadata tags may be obtained, for example, from the content provider or from another source, or it can be extracted from the content items 306 themselves.

As described in more detail below, each candidate content item 306 is scored based on its associated metadata tags. Specifically, each metadata tag has a Bayesian probability value indicating a probability that the user will be interested in content items having that metadata tag. This probability is based on the number of times the user previously watched (without skipping) content items having those metadata tags (or other metadata tags deemed to have some affinity for the metadata tags of the candidate content item). The probability may also be refined based on other types of user behavior that was observed during previous playback of content having relevant metadata tags, such as turning up the volume, watching a content item repeatedly, and the like.

Based on the Bayesian probability values, candidate content items 306 are selected, filtered, and/or ranked 204 for display to the user 309. For example, those candidate content items 306 having metadata tags associated with high levels of user interest are ranked higher than other candidate content items 306. Those highly-ranked candidate content items 306 are then shown sooner, and/or more frequently, and/or more prominently, than other content items 306. The inference is that the user 309 skipped over content items 306 that were of little interest, and watched content items 306 that were of greater interest. Thus, those candidate items 306 having metadata indicating a close match to the watched content items 306 would be more likely to be of interest than those candidate items 306 having metadata indicating a close match to the skipped-over content items 306.

In one embodiment, when a candidate content item 306 is associated with two or more metadata tags, Bayesian probability values for the individual metadata tags are aggregated to determine an overall score for the candidate content item 306. This overall score can then be compared with scores for other candidate content items 306 for ranking and selecting purposes.

The selection, filtering, and/or ranking step 204 can take place at the set-top box 305 itself. In another embodiment, step 204 can be performed by a central server or other remotely-located device (not shown) that communicates with set-top box 305 as needed. In either embodiment, this step 204 can take place independently of the content source 304 itself. Thus, the content source 304 need not be made aware of which particular content items are being selected for display. In this manner, user privacy can be preserved.

Based on the selection, filtering, and/or ranking of step 204, the selected content is presented 205 to the user 309.

In one embodiment, step 204 includes determining which candidate content items 306 are to be favored over other content items 306. Then, when content is presented 205 to the user 309, the content can be presented according to this determination, so that the content that is most likely to be of interest can be presented first and/or most often.

Figure 5:
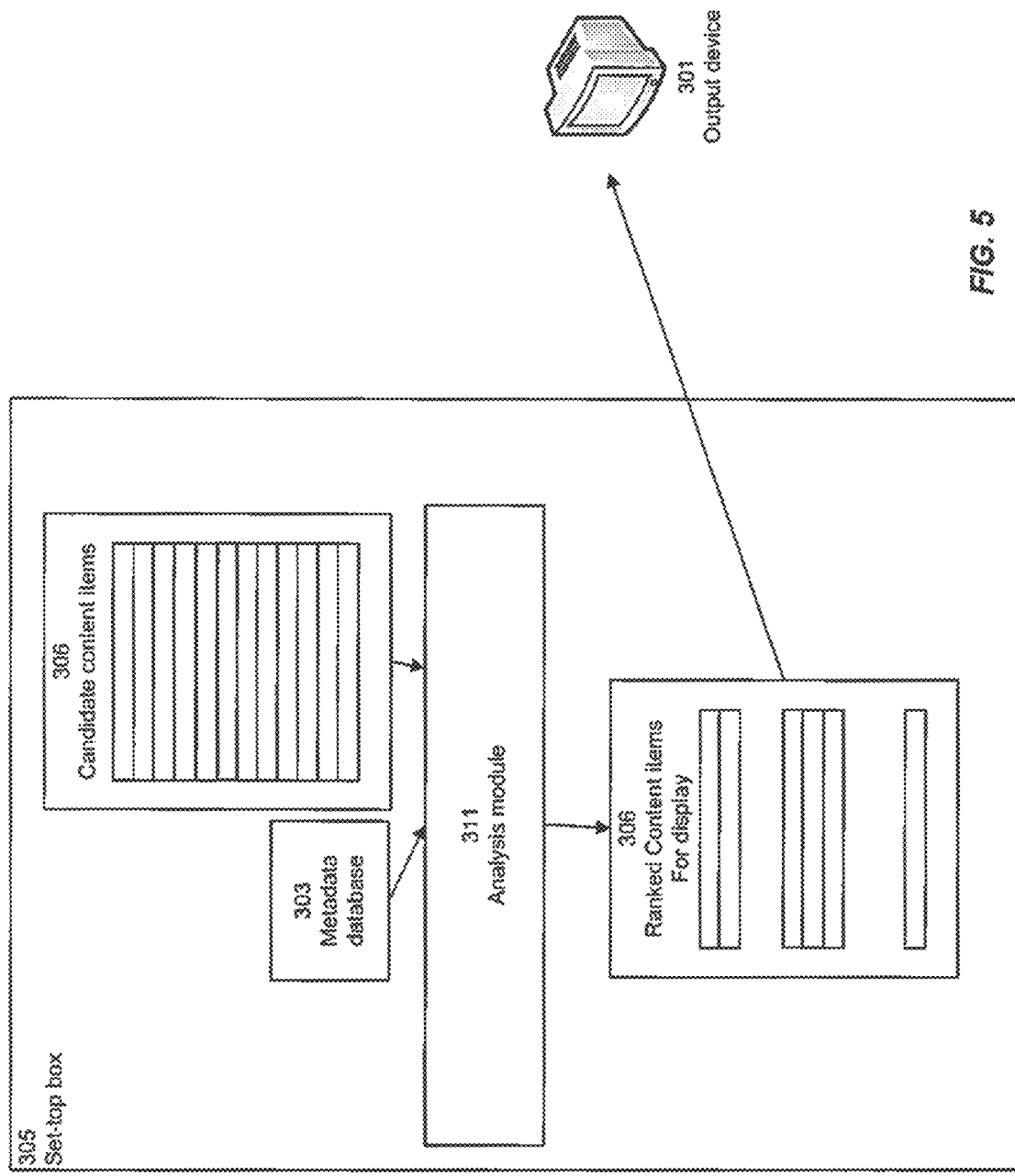
FIG. 5 is a more detailed block diagram depicting an architecture for implementing the present invention according to one embodiment, where candidate content items are stored at a set-top box.

Referring now to FIG. 5, there is shown a block diagram depicting, in more detail, an architecture in which candidate content items 306 are stored at the set-top box 305. For example, candidate content items 306 can be pre-loaded onto the set-top box 305 at some convenient time, such as when overall network traffic is low. Based on the metadata tags and Bayesian probability scores for candidate content items 306, the analysis module 311 selects and ranks particular content items 306 for display. The selected content items 306 are stored at the set-top box 305 and sent to the output device 301 at an appropriate time (for example, when it is time to show a commercial). Selected content items 306 can be ranked according to the relative probability of interest to the user, and then the items 306 can be displayed on output device 301 according to the determined rank. If desired, other content items that are not selected for display to the user can be deleted or retained for possible future display.

Figure 6:
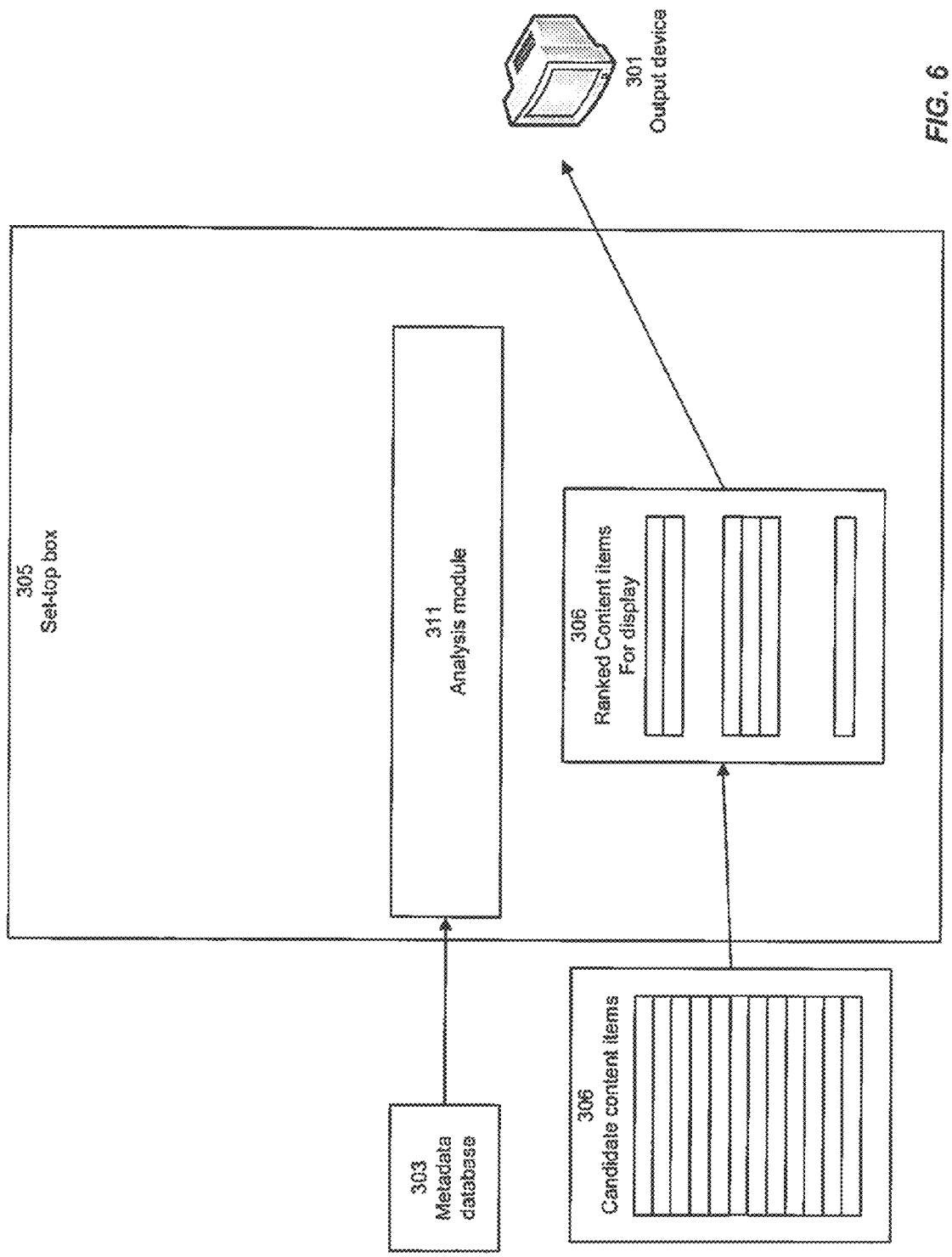
FIG. 6 is a more detailed block diagram depicting an architecture for implementing the present invention according to one embodiment, where candidate content items are stored at a central location.

Referring now to FIG. 6, there is shown a block diagram depicting, in more detail, an architecture in which candidate content items 306 are obtained from a remote source after selection is made as to which content items 306 should be displayed. As described above, based on the metadata tags and Bayesian probability scores for candidate content items 306, the analysis module 311 selects and ranks particular content items 306 for display. Then, selected content items 306 are obtained from the remote source, ranked, and sent to the output device 301 at an appropriate time (for example, when it is time to show a commercial). Selected content items 306 can be stored at the set-top box 305. In this manner, only those content items that are selected for display need be obtained; bandwidth and storage space can thereby be conserved. Alternatively, an external system (not shown) can use the metadata tags to determine which content items 306 should be transmitted from the remote source to the set-top box 305.

The present invention takes into account changes in user behavior over time, so that certain candidate content items that may be deemed of little interest at one time might be deemed to be of greater interest at another time. For example, it can be determined from user behavior that a user tends to skip over automobile commercials in the morning, but tends to watch them in the evening. Accordingly, the system of the present invention can select advertisements for display so that automobile commercials are shown in the evening rather than in the morning.

The present invention takes into account the possibility that more than one user may use the same television. Thus, different behavior profiles can be developed for each user. A determination as to which user is watching the television at any given time can be made, for example by requesting that the user identify him- or herself by entering a login code. Alternatively, such a determination can be made based on which channel is being watched, or by time of day, or by visual identification (such as by a camera), biometrics (fingerprints on the remote), or by any other means. Different users may be given different remotes, so as to enable identification of the particular user engaged in viewing content at any given time. In this manner, each user in the household sees those content items that are most likely to be of interest to that particular user. To implement such an embodiment, separate database records are maintained for each individual user. Alternatively, the present invention can assume the entire household is a single user, so that overall preferences for that household are determined in the aggregate, and used in filtering content.

In an alternative embodiment, the analysis of metadata for candidate content items as compared with user behavior data is performed prior to obtaining the content items themselves. Thus, filtering and selecting are performed prior to receiving content at the set-top box. Then, only those content items that are selected for display need be retrieved.

In another embodiment, user behavior with respect to content items can be used in filtering and tailoring content for other users. For example, a determination can be made that two users tend to share similar interests. This determination can be made based on any number of factors, including for example explicit indication by either user, observation of similar behavior in response to similar types of content, observed purchasing behavior, social network links, geographic proximity, similarity of demographics, and the like. Once such a determination is made, the behavior of one of the two users can be used as a factor in tailoring the presentation of content to the other user. Similarly, behavior of one group of users can be used as a factor in tailoring the presentation of content to another group of users.

In one embodiment, the behavior of multiple users is taken into account, and (if desired) different weights can be assigned to observed behavior of the different users. For example, the greatest weight can be given to the behavior of the user whose content is being tailored (the "target user"); the influence of other users' behavior can be weighted according to a degree of determined similarity of interests with respect to the target user. The greater the degree of similarity of interests, the greater the weight given to the observed behavior. Selection and tailoring of content is then performed based on aggregated observed behavior, taking into account the target user's behavior as well as that of other users.

Bayesian Filtering and Ranking

In one embodiment, the content ranking and filtering process mentioned above uses a Bayesian filtering and ranking process similar to the Bayesian spam filtering process that is known for filtering email messages. Such a process is described, for example, in M. Sahami, et al., "A Bayesian approach to filtering junk e-mail", AAAJ '98 Workshop on Learning for Text Categorization (1998).

Bayesian filtering uses the well-known Bayes theorem to calculate the probability that a particular item is of interest to a user. Given the metadata (m) for a content item (i), the probability that the item is of interest $p(i|m)$ is:

$$p(i|m)=p(m|i)*p(i)/p(m);$$

where $p(m|i)$ is the observed occurrence of certain metadata tag (m) in non-skipped content items (i);

$p(i)$ is the fraction of total content items (i) that are watched by the user without skipping;

$p(m)$ is the observed occurrence of the metadata tag (m) in all content items,

For example, suppose the tag "bicycle" appears in the metadata for 1.5% of all commercials (derived, for example, from closed captioning that accompanies the audiovisual content). Suppose further, that the user watches only 0.5% of all commercials without skipping, and that the tag "bicycle" appears in the metadata for 75% of all commercials that are watched without skipping. Then, the probability that an item having the metadata tag "bicycle" would be of interest is:

$$0.75*0.005/0.015=0.33$$

Therefore, there is a 33% chance that an item having a metadata tag containing the word "bicycle" would be of interest. Thus, when an item having this metadata tag is available for display to the user, the 33% probability can be compared against probabilities for content items having other metadata tags, in order to rank and/or filter content items to be shown to the user.

In one embodiment, the analysis takes into account the time at which a skip event took place, so as to isolate specific elements of the content that the user finds objectionable or of less interest. For example, if a user skips over content that he or she has not previously viewed, the specific time at which the skip took place is noted, so that an inference can be made as to the user's disinterest in a particular aspect of the content based on what was being shown at the time of the skip.

Figure 7:
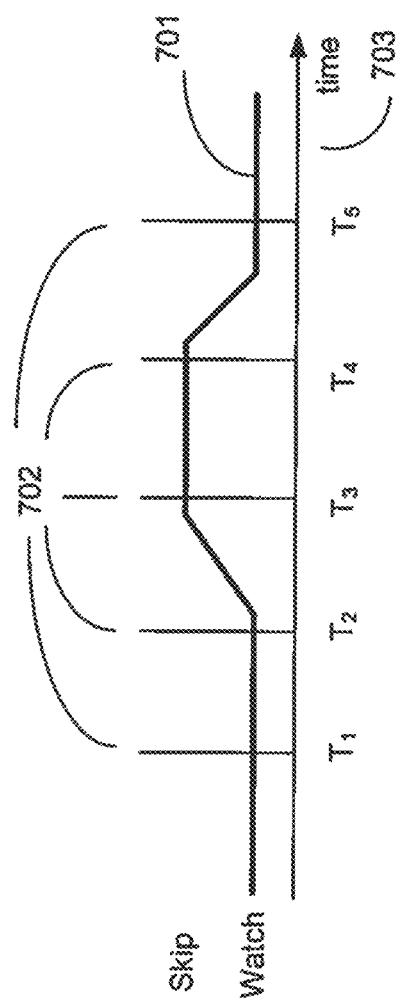
FIG. 7 is an example of a user's skipping behavior in connection with content associated with a series of metadata tags.

Referring now to FIG. 7, there is shown an example of a user's skipping behavior in connection with content associated with a series of metadata tags. Suppose the content item is associated with a metadata tag $T_{entire}$ that refers to the entire content item, and additional metadata tags 702 $T_1$, $T_2$, $T_3$, $T_4$, and $T_5$ refer to particular parts of the content item. Line 701 indicates skip operations on a time axis 703. As shown in FIG. 7, in this example the user presses the skip button after the portion of the content item associated with metadata tag $T_2$ is shown, and releases the skip button after the portion of the content item associated with metadata tag $T_4$ is shown. Thus, the portions of the content item associated with metadata tags $T_3$ and $T_4$ were not seen.

Accordingly, the values of $p(T|D)$ are computed for $T_{entire}$ as well as for $T_1$, $T_2$, and $T_5$. In one embodiment, each value of $p(T|D)$ indicates a probability that the document/stream is junk/uninteresting based on the known association of the particular metadata tag D being junk/uninteresting. Conversely, in other embodiments, each value of $p(T|D)$ indicates a probability that the document/stream is of interest to the user based on the known association of the particular metadata tag D being of interest to the user. If any of the metadata tags $T_{entire}$, $T_1$, $T_2$ and/or $T_5$ have previously appeared in other content items, then the corresponding $p(T|D)$ is a recalculation of a previous value, to take into account the additional occurrence in the new content item. For metadata tags that have not been seen before, the corresponding $p(T|D)$ is a newly stored value in database 303.

In one embodiment, no computation is performed for tags $T_3$ and $T_4$, since they were not seen. If any previous scores existed for these tags, they are left untouched, in another embodiment, where skipped-over content can be viewed by the user (for example in a fast version as it is being skipped), some inference can be made about the interest level of these tags. For example, it can be inferred that the user is not interested in such content by virtue of the fact that, given a glimpse of the content in a fast view, he or she continued to skip over the content. For example, the corresponding p(T|D) can be adjusted to lower the degree of occurrence of the tags $T_3$ and $T_4$ either by a single occurrence or by some fraction of an occurrence, In one embodiment, if a user later a watches previously skipped-over material, p(T|D) values for the metadata tags corresponding to the watched content are restored to their initial state, or reset. In another embodiment, the values are refined to take into account the fact that the user watched the content, but the values are not reset completely.

In one embodiment, if a user skips over previously viewed material, the system of the present invention can assume that the skip took place because the content was already viewed, and not necessarily because of disinterest; accordingly, the behavior observed during the initial viewing is used. Accordingly, the original Bayesian values as previously determined are retained. In another embodiment, new values are reassigned based on the latest behavior; alternatively, some weighted combination of the previous and new behavior can be used, for example by aging the original tag weights. This aging reflects the fact that viewers' interests may change over time, so that older weights should be given less importance than more recent ones.

An advantage of the Bayesian analysis is that content filtering and prioritizing operations can be personalized to individual users, based on observation of their own behavior. For users who tend to skip most commercials, the fact that they watched a particular commercial is given greater weight than it would be for a user to tends to watch most commercials. The Bayesian analysis takes into account such differences from user to user.

In one embodiment, the system of the present invention continually refines the Bayesian analysis and content item tags, as more user behavior is observed. Thus, as the user views more and more content, and skips that content that is of less interest while watching content that is of more interest, the predictive value of the Bayesian analysis improves. Furthermore, in one embodiment, the data can be aged, so that more recent user behavior is given greater weight than user behavior that took place in the past. Thus, as users move from one interest to another, the present invention can take into account these changes and provide content that is of current interest. For example, a user may be interested in watching commercials relating to cars because he or she is in the market for a car. Once the user buys a car, he or she is no longer in the market and may no longer be interested in watching such content.

In one embodiment, an initial "training mode" is provided, where the user can choose from a set of sample content items. Alternatively, the user can respond to a questionnaire, such as an online questionnaire, to determine an initial set of interest levels for various types of content. Then, once the training mode is complete, the indicated preferences are refined as further user behavior is observed.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of selecting content items for presentation to a user, comprising:
    obtaining a list of candidate content items;
    obtaining metadata tags associated with the candidate content items;
    selecting at least one of the candidate content items for presentation to a user, based on previously stored user exposure scores for one or more metadata tags associated with the candidate content item, wherein the metadata tags refer to non-skipped portions of content items associated with the metadata tags and not to a skipped portion of the content items, the user exposure scores based on a number of occurrences of viewings of the non-skipped portions of the content items associated with the metadata tags, wherein the non-skipped portions of the content items are defined by demarcation points with respect to one or more skipped portions of the content items, each demarcation point being designated automatically in response to skipping within the content items based on user input during presentation of the content items, the designated demarcation points between the skipped portions and the non-skipped portions specifying a start point and an end point for the skipped portion.

2. The method of claim 1, the method further comprising:
    presenting the selected at least one of the candidate content items.

3. The method of claim 1, the method further comprising:
    transmitting the selected at least one of the candidate items to a device through a network.

4. The method of claim 1, wherein selecting at least one of the candidate content items for presentation to the user comprises:
    performing a Bayesian filtering analysis using the user exposure scores for metadata tags associated with the candidate content items.

5. The method of claim 4, wherein performing the Bayesian filtering analysis comprises:
    determining, for each of at least a subset of the candidate content items, a value for
    $p(i|m)=p(m|i)*p(i)/p(m)$; where $p(m|i)$ is the observed occurrence of a metadata tag (m) associated with the candidate content item in non-skipped portions of content items (i) previously viewed by the user;
$p(i)$ is the fraction of total non-skipped portions of content items (i) previously viewed by the user; and
$p(m)$ is the observed occurrence of the metadata tag (m) in all content items.

6. The method of claim 1, further comprising, prior to selecting at least one of the candidate content items for presentation to the user, obtaining the candidate content items from a remote content source.

7. The method of claim 1, further comprising, prior to presenting the selected at least one of the candidate content items, obtaining the selected at least one candidate content items from a remote content source.

8. The method of claim 1, wherein at least one of the candidate content items is associated with at least two metadata tags, and wherein selecting at least one of the candidate content items for presentation to the user is performed based on an aggregate of the user exposure scores for the at least two metadata tags associated with the candidate content item.

9. The method of claim 1 wherein the content items comprises one or more of: (a) audiovisual content items; (b) commercials or advertisements; or (c) audio content items.

10. The method of claim 1 wherein the list of candidate content items and metadata tags associated with the candidate content items are stored at a remote source and wherein the selecting is performed remotely from a client device which presents the selected at least one candidate content items.

11. A machine readable non-transitory storage medium storing executable program instructions which when executed by a data processing system cause the system to perform a method of selecting content items for presentation to a user, the method comprising:
    obtaining a list of candidate content items;
    obtaining metadata tags associated with the candidate content items;
    selecting at least one of the candidate content items for presentation to a user, based on previously stored user exposure scores for one or more metadata tags associated with the candidate content item, wherein the metadata tags refer to non-skipped portions of content items associated with the metadata tags and not to a skipped portion of the content items, the user exposure scores based on a number of occurrences of viewings of the non-skipped portions of the content items associated with the metadata tags, wherein the non-skipped portions of the content items are defined by demarcation points with respect to one or more skipped portions of the content items, each demarcation point being designated automatically in response to skipping within the content items based on user input during presentation of the content items, the designated demarcation points between the skipped portions and the non-skipped portions specifying a start point and an end point for the skipped portion.

12. The medium of claim 11, the method further comprising:
    presenting the selected at least one of the candidate content items.

13. The medium of claim 11, the method further comprising:
    transmitting the selected at least one of the candidate items to a device through a network.

14. The medium of claim 11, wherein selecting at least one of the candidate content items for presentation to the user comprises:

performing a Bayesian filtering analysis using the user exposure scores for metadata tags associated with the candidate content items.

15. The medium of claim 14, wherein performing the Bayesian filtering analysis comprises:

determining, for each of at least a subset of the candidate content items, a value for $p(i|m)=p(m|i)*p(i)/p(m)$; where p(m|i) is the observed occurrence of a metadata tag (m) associated with the candidate content item in non-skipped portions of content items (i) previously viewed by the user;

p(i) is the fraction of total non-skipped portions of content items (i) previously viewed by the user; and p(m) is the observed occurrence of the metadata tag (m) in all content items.

16. The medium of claim 11, further comprising, prior to selecting at least one of the candidate content items for presentation to the user, obtaining the candidate content items from a remote content source.

17. The medium of claim 11, further comprising, prior to presenting the selected at least one of the candidate content items, obtaining the selected at least one candidate content items from a remote content source.

18. The medium of claim 11, wherein at least one of the candidate content items is associated with at least two metadata tags, and wherein selecting at least one of the candidate content items for presentation to the user is performed based on an aggregate of the user exposure scores for the at least two metadata tags associated with the candidate content item.

19. The medium of claim 11 wherein the content items comprises one or more of: (a) audiovisual content items; (b) commercials or advertisements; or (c) audio content items.

20. The medium of claim 11 wherein the list of candidate content items and metadata tags associated with the candidate content items are stored at a remote source and wherein the selecting is performed remotely from a client device which presents the selected at least one candidate content items.

* * * * *